United States Patent
Oughton, Jr. et al.

(10) Patent No.: US 9,397,584 B2
(45) Date of Patent: Jul. 19, 2016

(54) MULTI-LEVEL CONVERTER APPARATUS AND METHODS USING CLAMPED NODE BIAS

(71) Applicant: Eaton Corporation, Cleveland, OH (US)

(72) Inventors: George William Oughton, Jr., Raleigh, NC (US); Haidong Yu, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 235 days.

(21) Appl. No.: 14/036,293

(22) Filed: Sep. 25, 2013

(65) Prior Publication Data

US 2015/0085546 A1  Mar. 26, 2015

(51) Int. Cl.
*H02M 7/797* (2006.01)
*H02M 1/32* (2007.01)
*H02M 7/487* (2007.01)
*H02M 7/217* (2006.01)

(52) U.S. Cl.
CPC ............... *H02M 7/797* (2013.01); *H02M 1/32* (2013.01); *H02M 7/487* (2013.01); *H02M 7/217* (2013.01)

(58) Field of Classification Search
CPC ...................................................... H02M 7/797
See application file for complete search history.

(56) References Cited

U.S. PATENT DOCUMENTS

| | | | |
|---|---|---|---|
| 5,361,196 A | 11/1994 | Tanamachi et al. | |
| 5,506,765 A * | 4/1996 | Nakata | B60L 9/22 363/132 |
| 6,031,738 A | 2/2000 | Lipo et al. | |
| 6,337,804 B1 * | 1/2002 | Kea et al. | 363/132 |
| 6,795,323 B2 | 9/2004 | Tanaka et al. | |
| 6,838,925 B1 | 1/2005 | Nielsen | |
| 7,145,268 B2 | 12/2006 | Edwards et al. | |
| 7,164,589 B1 * | 1/2007 | Soldano et al. | 363/21.04 |
| 7,573,732 B2 | 8/2009 | Teichmann et al. | |
| 8,564,994 B2 * | 10/2013 | Capitaneanu et al. | 363/95 |
| 8,582,331 B2 * | 11/2013 | Frisch | H02M 7/48 363/131 |
| 8,929,114 B2 * | 1/2015 | Li | H02M 1/34 363/130 |
| 9,184,585 B2 * | 11/2015 | Huselstein | H02M 1/32 |
| 2011/0109162 A1 | 5/2011 | Rizet et al. | |
| 2013/0272045 A1 * | 10/2013 | Soeiro | H02M 7/537 363/131 |
| 2014/0340124 A1 * | 11/2014 | Hirler et al. | 327/108 |
| 2014/0376293 A1 * | 12/2014 | West | H02M 1/126 363/131 |

FOREIGN PATENT DOCUMENTS

| | | |
|---|---|---|
| EP | 0 727 870 A2 | 8/1996 |
| JP | 2004-173449 | 6/2004 |

OTHER PUBLICATIONS

International Search Report and Written Opinion Corresponding to International Application No. PCT/US2014/056341; Date of Mailing: Jan. 16, 2015; 13 Pages.

* cited by examiner

*Primary Examiner* — Emily P Pham
(74) *Attorney, Agent, or Firm* — Myers Bigel Sibley, P.A.

(57) ABSTRACT

A multi-level converter includes first and second DC buses, a plurality of transistors coupled in series between the first and second DC buses and a clamp circuit configured to clamp a node joining a first transistor and a second transistor of the plurality of transistors. The converter further includes a bias circuit coupled to the clamped node, which may reduce or prevent voltage stress on the transistors. Related methods of operation are also described.

19 Claims, 4 Drawing Sheets

MULTI-LEVEL CONVERTER APPARATUS AND METHODS USING CLAMPED NODE BIAS

BACKGROUND

The inventive subject matter relates to power conversion circuits and methods and, more particularly, to inverter apparatus and methods.

Rectifier and inverter circuits are used in uninterruptible power supply (UPS) systems, motor drives and other power apparatus. Some inverters and rectifiers have a multilevel architecture that uses multiple commutation states. Various multilevel inverter and rectifier circuits are described, for example, in U.S. Pat. No. 5,361,196 to Tamamachi et al., U.S. Pat. No. 6,031,738 to Lipo et al., U.S. Pat. No. 6,795,323 to Tanaka et al., U.S. Pat. No. 6,838,925 to Nielsen, U.S. Pat. No. 7,145,268 to Edwards et al. and U.S. Pat. No. 7,573,732 to Teichmann et al.

SUMMARY

Some embodiments of the inventive subject matter provide a multi-level converter including first and second DC buses, a plurality of transistors coupled in series between the first and second DC buses and a clamp circuit configured to clamp a node joining a first transistor and a second transistor of the plurality of transistors. The converter further includes a bias circuit coupled to the clamped node.

The second transistor may be coupled between the clamped node and an AC node. The converter may be configured to operate as a rectifier and the second transistor may be coupled between the clamped node and a phase input. In further embodiments, the converter may be configured to operate as an inverter and the second transistor may be coupled between the clamped node and a phase output.

In further embodiments, the bias circuit may be configured to couple the clamped node to the first DC bus and the first and second transistors may be coupled between the second DC bus and an AC node. The bias circuit may include a resistor coupling the clamped node to the first DC bus. The bias circuit may be further configured to discharge a capacitance coupled to the first DC bus using the clamp circuit.

Further embodiments provide a multi-level converter including first and second DC buses, an AC node, a neutral node, first and second transistors coupled in series between the first DC bus and the AC node, a diode coupled between the neutral node and a neutral clamped node joining the first and second transistors, and a resistor coupling the neutral clamped node to the second DC bus. The converter may further include third and fourth transistors coupled in series between the second DC bus and the AC node, a second diode coupled between the neutral node and a second neutral clamped node joining the third and fourth transistors, and a second resistor coupled between the second neutral clamped node and the first DC bus.

Still further embodiments provide methods of operating a multi-level converter including biasing a clamped node joining a first transistor and a second transistor of the converter to limit a voltage developed across the second transistor. The second transistor may be coupled between the clamped node and an AC node of the converter. Biasing the clamped node may include coupling the clamped node to a DC bus of the converter using, for example, a resistor,

DETAILED DESCRIPTION OF EXEMPLARY EMBODIMENTS

Figure 1:
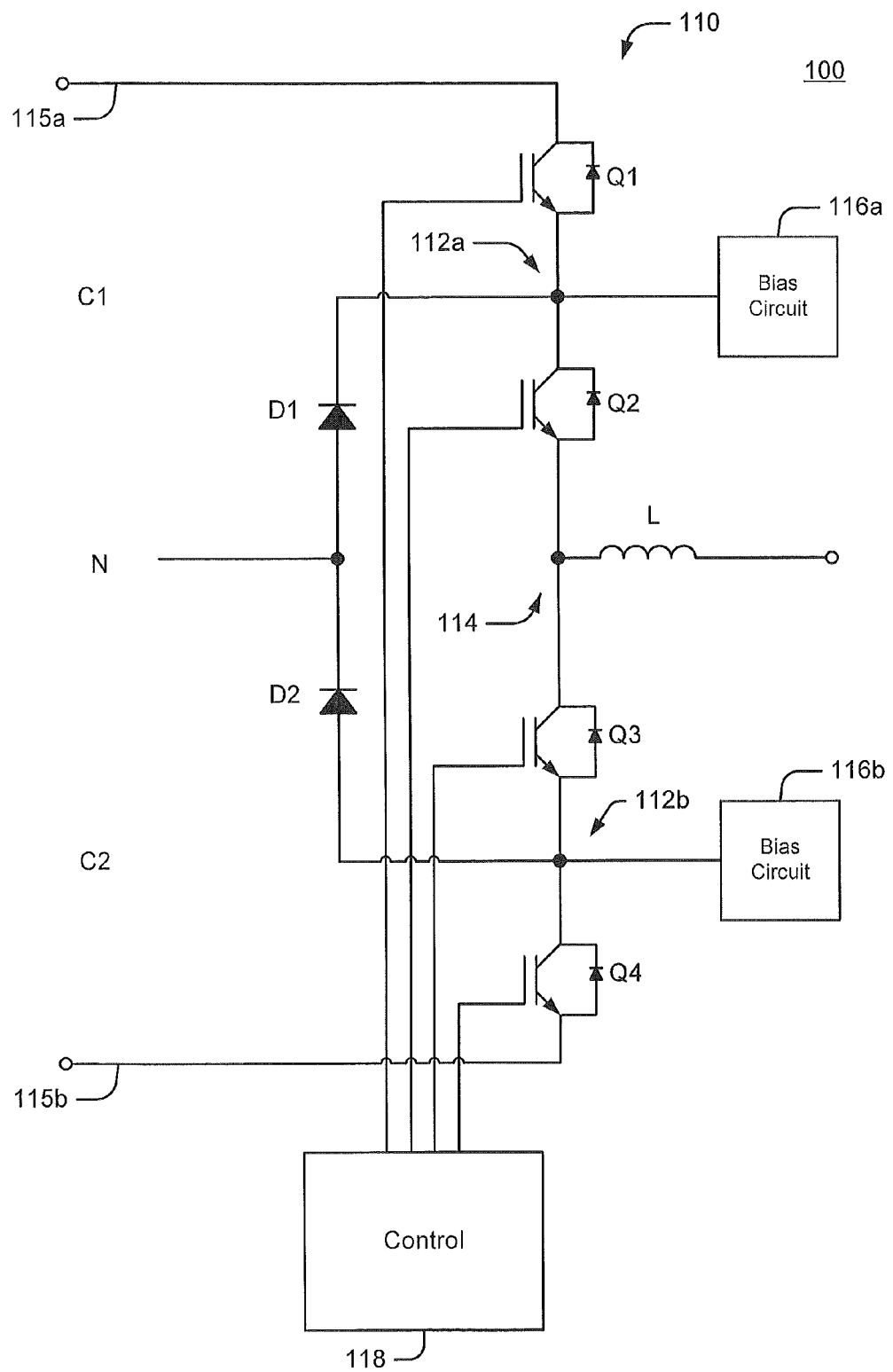
FIG. 1 is a schematic diagram illustrating a converter according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a multi-level converter 100 according to some embodiments. The converter 100 may be utilized as an inverter and/or rectifier, and includes a plurality of transistors, here shown as first, second, third and fourth insulated gate bipolar transistors (IGBTs) Q1, Q2, Q3, Q4. The first and second transistors Q1, Q2 are coupled between a first DC bus 115a and an AC node 114 and the third and fourth transistors Q3, Q4 are coupled between a second DC bus 115b and the AC node 114. The AC node 114 may be coupled to an external source and/or load via an inductor L. The transistors Q1, Q2, Q3, Q4 may be controlled by a control circuit 118. Antiparallel diodes paired with the transistors Q1, Q2, Q2, Q4 may be integrated with the transistors or may be separate components. Nodes 112a, 112b between first and second transistors Q1, Q2 and third and fourth transistors Q3, Q4, respectively, are neutral clamped using respective diodes D1, D2 coupled between the nodes 112a, 112b and a neutral node N. The neutral clamping supports multilevel operation.

As further shown, the converter 100 includes bias circuits 116a, 116b coupled to the neutral clamped nodes 112a, 112b. The bias circuits 116a, 116b are configured to bias the neutral clamped nodes 112a, 112b to a predetermined voltage when the first and fourth transistors Q1, Q4 are off. As explained in greater detail below, the bias circuits 116a, 116b may serve to limit voltage developed across the inner transistors Q2, Q3 under certain conditions.

Figure 2:
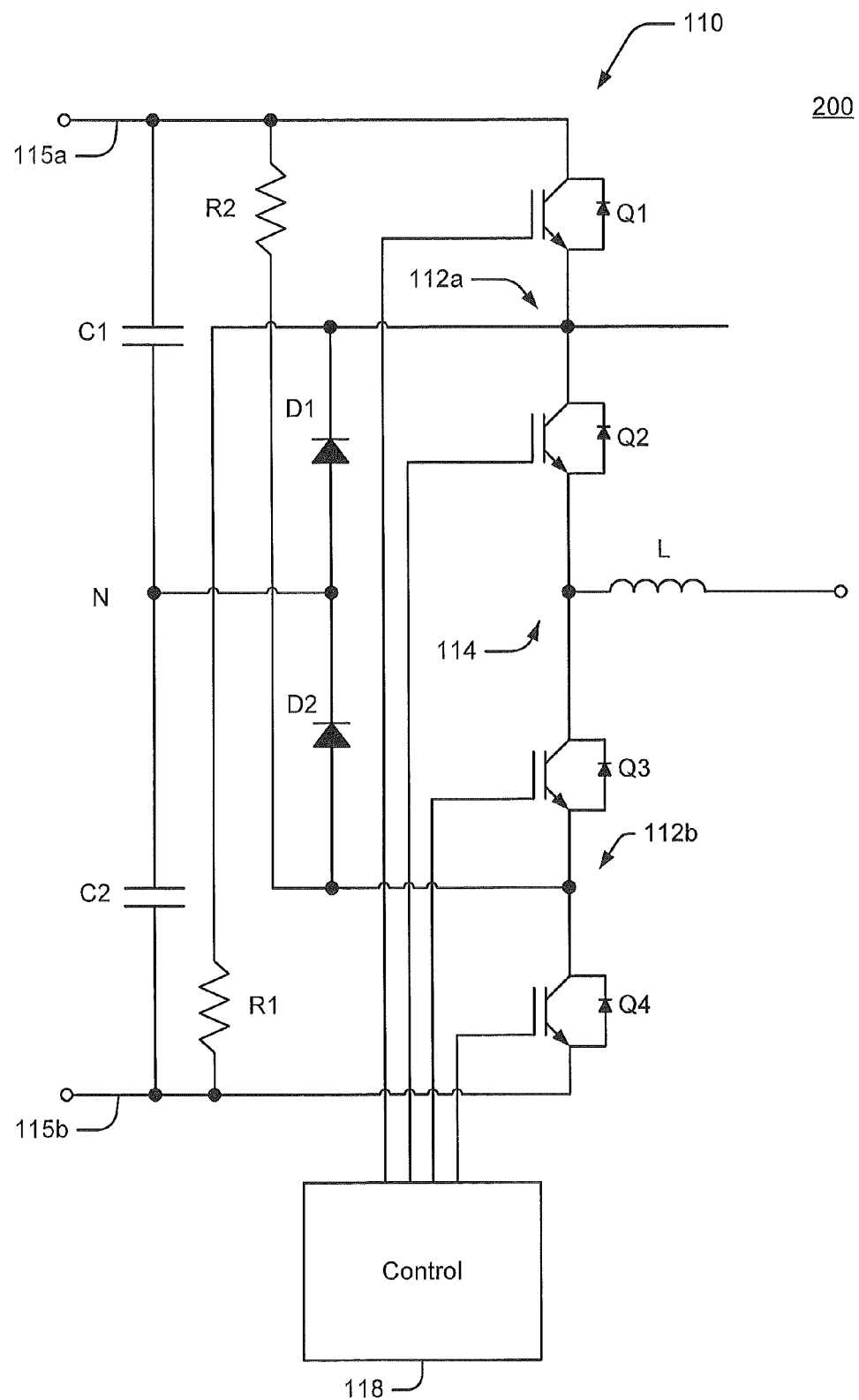
FIG. 2 is a schematic diagram illustrating a converter according to further embodiments.

FIG. 2 illustrates a multilevel converter 200 according to further embodiments, wherein clamped node biasing is provided by resistors coupled to DC buses. The converter 200 includes first and second DC buses 115a, 115b, first, second, third and fourth transistors Q1, Q2, Q3, Q4, neutral clamping diodes D1, D2, inductor L, AC node 114 and first and second neutral clamping nodes 112a, 112b as described above with reference to FIG. 1. A first bias resistor R1 is coupled between the first neutral clamped node 112a and the second DC bus 115b. A second bias resistor R2 is coupled between the second neutral clamped node 112b and the first DC bus 115a. The bias provided by the resistors R1, R2 can prevent damaging voltage levels from developing across the inner second and third transistors Q2, Q3 if, for example, a voltage surge occurs in a line coupled to the AC node 114 while the converter 200 is in an inactive state with all of the transistors Q1, Q2, Q3, Q4 off. The resistors R1, R2 may have resistance values sufficient to provide bias to protect the inner second and third transistors Q2, Q3, without supporting unduly large currents between the buses 115a, 115b and the neutral N. The first and second bias resistors R1, R2 may also support discharging (bleeding) of capacitors C1, C2 coupled to the first and second DC buses 115a, 115b via the neutral clamping diodes D1, D2 to de-energize the buses 115a, 115b for maintenance and other purposes.

Figure 3:
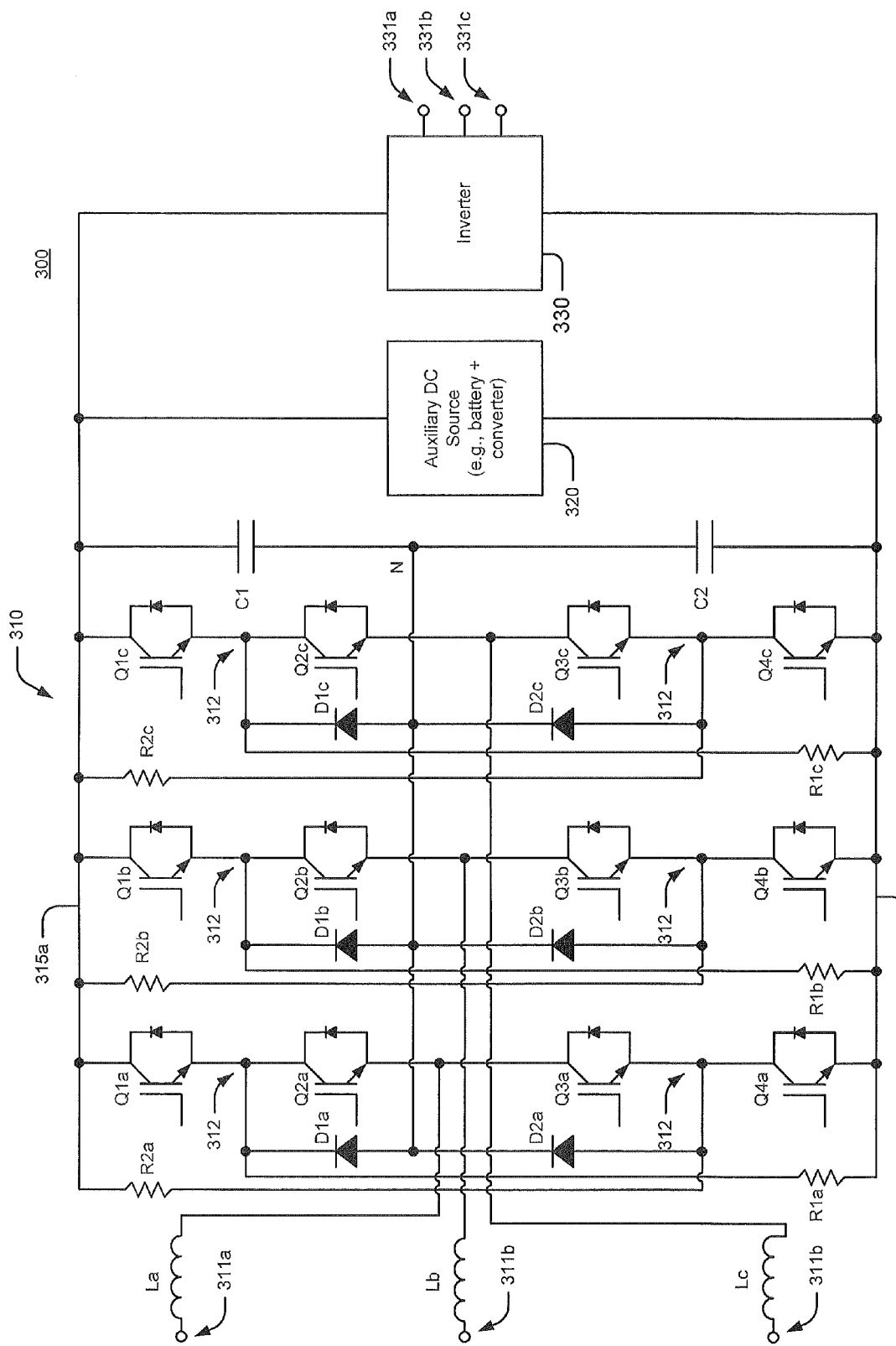
FIG. 3 is a schematic diagram illustrating an uninterruptible power supply (UPS) including an inverter according to some embodiments.

Converter circuits according to some embodiments may be advantageously used in UPS applications. For example, FIG. 3 illustrates a UPS 300 including a rectifier 310, which has phase inputs 311a, 311b, 311c configured to be coupled to an AC source, such as a utility or generator. An output of the rectifier 310 is coupled to an inverter circuit 330 by first and second DC buses 315a, 315b. The inverter circuit has phase outputs 331a, 331b, 331c configured to be coupled to a load. As further shown, an auxiliary power source 420, such as a battery or battery converter configured to be coupled to a battery, may also be coupled to the first and second DC buses 315a, 315b. Storage capacitors C1, C2 are coupled between respective ones of the first and second DC buses 315a, 315b and a neutral N.

As shown, the rectifier 310 may be a multi-level rectifier having phase inputs 311a, 311b, 311c and including input inductors La, Lb, Lc, upper transistors Q1a, Q2a, Q1b, Q2b, Q1c, Q2c coupled between the first DC bus 315a and the neutral N, and lower transistors Q3a, Q4a, Q3b, Q4b, Q3c, Q4c coupled between the second DC bus 315b and the neutral N. Diodes D1a, D2a, D1b, D2b, D1c, D2c provide neutral clamping of respective nodes 312 between respective ones of the upper and lower transistor pairs. Resistors R1a, R2a, R1b, R2b, R1c, R2c bias the neutral clamped nodes 312 and provide current paths for discharging the first and second DC buses 315a, 315b. The UPS 300 may also include control circuitry (not shown for clarity of illustration) for driving the transistors Q1a, Q2a, Q1b, Q2b, Q1c, Q2c, Q3a, Q4a, Q3b, Q4b, Q3c, Q4c, as well as additional circuitry, such as bypass circuitry.

Figure 4:
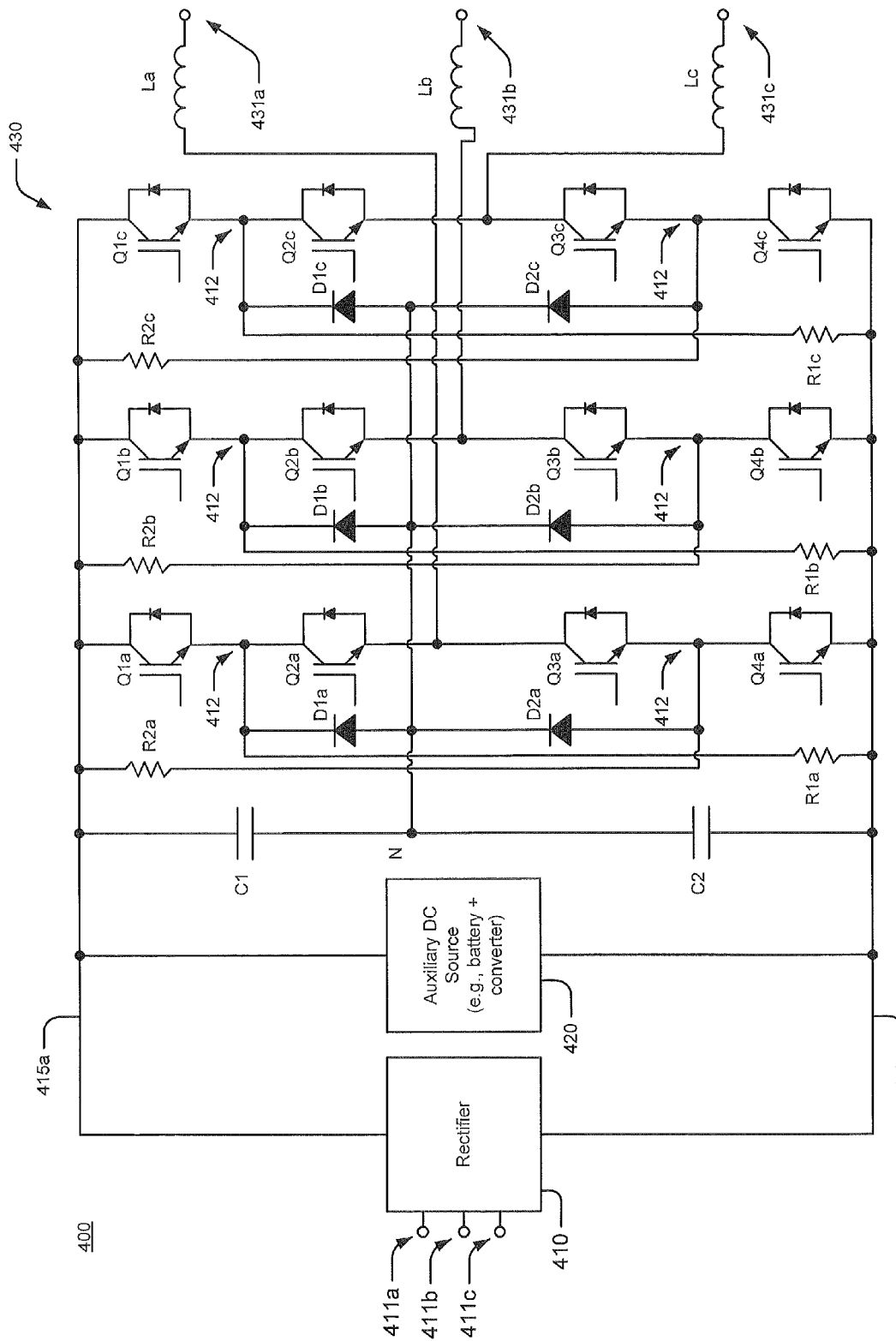
FIG. 4 is a schematic diagram illustrating a UPS including a rectifier according to some embodiments.

FIG. 4 illustrates a UPS 400 including a rectifier 410 having phase inputs 411a, 411b, 411c configured to be coupled to an AC source, such as a utility or generator. An output of the rectifier 410 is coupled to an inverter circuit 430 by first and second DC buses 415a, 415b. The inverter circuit has phase outputs 431a, 431b, 431c configured to be coupled to a load. As further shown, an auxiliary power source 420 may also be coupled to the first and second DC buses 415a, 415b. Storage capacitors C1, C2 are coupled between respective ones of the first and second DC buses 415a, 415b to a neutral N.

The inverter 430 may be a multi-level inverter including output inductors La, Lb, Lc, upper transistors Q1a, Q2a, Q1b, Q2b, Q1c, Q2c coupled between the first DC bus 415a and the neutral N, and lower transistors Q3a, Q4a, Q3b, Q4b, Q3c, Q4c coupled between the second DC bus 415b and the neutral N. Diodes D1a, D2a, D1b, D2b, D1c, D2c provide neutral clamping of respective nodes 412 between respective ones of the upper and lower transistor pairs. Resistors R1a, R2a, R1b, R2b, R1c, R2c bias the neutral clamped nodes 412 and provide discharge paths for the first and second DC buses 415a, 415b. The UPS 400 may also include control circuitry for driving the transistors Q1a, Q2a, Q1b, Q2b, Q1c, Q2c, Q3a, Q4a, Q3b, Q4b, Q3c, Q4c (not shown for clarity of illustration), along with other circuitry, such as bypass circuitry.

It will be appreciated that converters according to some embodiments of the inventive subject matter may be used in any of a number of different applications, such as rectifiers, inverters, motor drives and the like. Further embodiments may use bias circuits other than the resistor connections described above with reference to FIGS. 2-4, such as bias circuits that use other passive networks and/or active devices to provide similar biasing. It will further appreciated that, although the illustrated example embodiments include three-level converters with neutral clamped nodes, some embodiments of the inventive subject matter may provide other types of multi-level converters, such as converters with more than four transistors and/or more than three states, having nodes that are clamped in other ways and biased using bias circuitry similar to that described above.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A neutral point clamped multi-level converter comprising:
   first and second DC buses;
   a plurality of transistors coupled in series between the first and second DC buses;
   a clamp circuit configured to clamp a node joining a first transistor and a second transistor of the plurality of transistors to a neutral node of the multi-level converter;
   an AC node coupled to the plurality of transistors, wherein the second transistor is coupled between the clamped node and the AC node; and
   a bias circuit coupled to the clamped node.

2. The multi-level converter of claim 1 configured to operate as a rectifier, wherein the AC node comprises a phase input of the rectifier and wherein the second transistor is coupled between the clamped node and the phase input.

3. The multi-level converter of claim 1 configured to operate as an inverter, wherein the AC node comprises a phase output of the inverter and wherein the second transistor is coupled between the clamped node and the phase output.

4. The multi-level converter of claim 1, wherein the bias circuit is configured to couple the clamped node to the first DC bus.

5. The multi-level converter of claim 4, wherein the first and second transistors are coupled between the second DC bus and the AC node.

6. The multi-level converter of claim 5, wherein the bias circuit comprises a resistor coupling the clamped node to the first DC bus.

7. The multi-level converter of claim 4, wherein the bias circuit is further configured to discharge a capacitance coupled to the first DC bus using the clamp circuit.

8. An uninterruptible power supply comprising the multi-level converter of claim 1.

9. A neutral point clamped multi-level converter comprising:
first and second DC buses;
an AC node;
a neutral node;
first and second transistors coupled in series between the first DC bus and the AC node;
a diode coupled between the neutral node and a neutral clamped node joining the first and second transistors; and
a resistor coupling the neutral clamped node to the second DC bus.

10. The multi-level converter of claim 9, wherein the diode comprises a first diode, wherein the neutral clamped node comprises a first neutral clamped node, wherein the resistor comprises a first resistor, and wherein the converter further comprises:
third and fourth transistors coupled in series between the second DC bus and the AC node; and
a second diode coupled between the neutral node and a second neutral clamped node joining the third and fourth transistors; and
a second resistor coupled between the second neutral clamped node and the first DC bus.

11. An uninterruptible power supply comprising the multi-level converter of claim 10.

12. The uninterruptible power supply of claim 11, wherein the multi-level converter is a rectifier or an inverter.

13. A method of operating a neutral point clamped multi-level converter comprising a plurality of transistors coupled in series between the first and second DC buses, and a clamp circuit configured to clamp a node joining a first transistor and a second transistor of the plurality of transistors to a neutral node of the multi-level converter, wherein the second transistor is coupled between the clamped node an AC node, the method comprising:
biasing the clamped node to a predetermined voltage to limit a voltage developed across the second transistor.

14. The method of claim 13, wherein the second transistor is coupled between the clamped node and an AC node of the multi-level converter.

15. The method of claim 13, wherein the second transistor comprises an inner transistor of the multi-level converter.

16. The method of claim 13, wherein the multi-level converter comprises a rectifier and wherein the second transistor is coupled between the clamped node and a phase input.

17. The method of claim 13, wherein the multi-level converter comprises an inverter and wherein the second transistor is coupled between the clamped node and a phase output.

18. The method of claim 13, wherein biasing the clamped node to a predetermined voltage to limit a voltage developed across the second transistor comprises coupling the clamped node to a DC bus of the multi-level converter.

19. The method of claim 18, wherein coupling the node to a DC bus of the multi-level converter comprises coupling the node to the DC bus via a resistor.

* * * * *